United States Patent [19]
Matsui

[11] Patent Number: 6,050,731
[45] Date of Patent: Apr. 18, 2000

[54] CODE IMAGE QUALITY CHECK APPARATUS AND CODE IMAGE READER

[75] Inventor: Shinzo Matsui, Yamanashi-ken, Japan

[73] Assignee: Olympus Optical Co., Ltd., Tokyo, Japan

[21] Appl. No.: 09/107,962

[22] Filed: Jun. 30, 1998

[30] Foreign Application Priority Data

Jul. 16, 1997 [JP] Japan .................................. 9-191313

[51] Int. Cl.⁷ ....................................................... B41J 3/42
[52] U.S. Cl. ............................ 400/74; 400/103; 400/104
[58] Field of Search .............................. 400/103, 55, 74, 400/104

[56] References Cited

U.S. PATENT DOCUMENTS 4,699,531  10/1987  Ulinski, Sr. et al. ...................... 400/74
5,564,841  10/1996  Austin et al. ............................ 400/103

FOREIGN PATENT DOCUMENTS 0 670 555 A1  9/1995  European Pat. Off. .
63-33748     7/1988  Japan .
5-77530      3/1993  Japan .
6-301807    10/1994  Japan .
9-274636    10/1997  Japan .

*Primary Examiner*—John Hilten
*Assistant Examiner*—Charles H. Nolan, Jr.
*Attorney, Agent, or Firm*—Frishauf, Holtz, Goodman, Langer & Chick, P.C.

[57] ABSTRACT

A code image quality check apparatus adapted to check the quality of a code image printed and recorded on a printing medium as an optically readable image of error correcting code data containing information data adapted to be optically read by manual scanning. The error correcting code data is provided with the ability of correcting errors in response to code image read errors. The code image quality check apparatus extracts code image read errors from the error correcting code data restored from the read code image without executing any error correcting operation and reduces the extracted read errors into numerical values, using a predetermined unit, which numerical values are then notified to the user in a predetermined display mode at the output section of the apparatus.

15 Claims, 11 Drawing Sheets

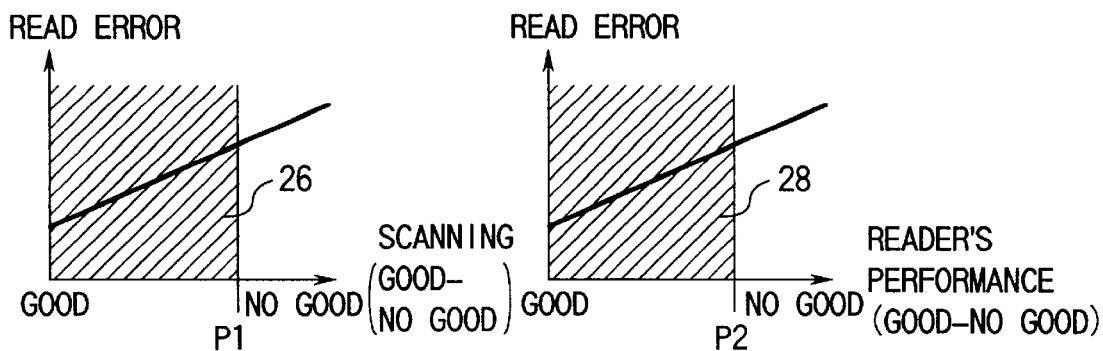
FIG. 2A PRIOR ART
FIG. 2B PRIOR ART
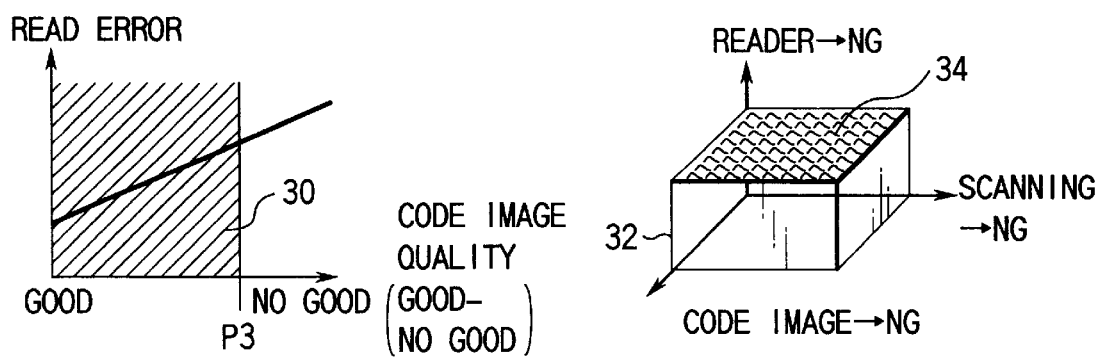
FIG. 2C PRIOR ART
FIG. 3A PRIOR ART
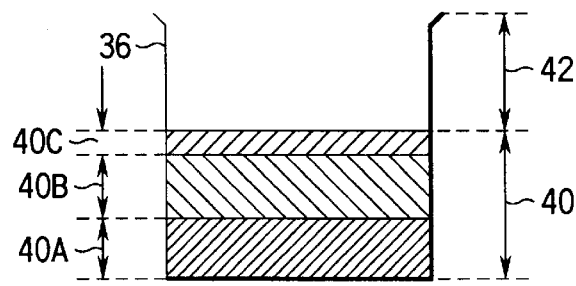
FIG. 3B PRIOR ART
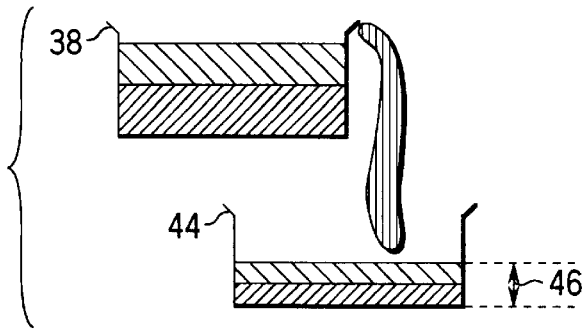
FIG. 3C PRIOR ART DOT ERROR RATE :0.13%
TOTAL NUMBER OF FETCHED
BLOCKS/TOTAL NUMBER OF BLOCKS:66/68

DATA (BYTE) ERROR RATE :1.2%
REFERENCE MACHINE ERROR RATE :1.5%
TOTAL NUMBER OF FETCHED
BLOCKS/TOTAL NUMBER OF BLOCKS:66/68

REPRODUCIBILITY :OK

CODE IMAGE QUALITY CHECK APPARATUS AND CODE IMAGE READER

BACKGROUND OF THE INVENTION

This invention relates to a code image quality check apparatus adapted to check the quality of a code image printed and recorded as an optically readable image of a piece of information containing at least audio information, video information or digital data. This invention also relates to a code image reader for optically reading such a code image and restoring the original piece of information of the code image.

The assignee of the present invention already proposed a dot code system for using a code image that is adapted to be printed and recorded on a printing medium such as an a sheet of paper as optically readable image of a piece of information that may be audio information and an optical reader for manually scanning the printed dot code and optically reading it to restore and output the original audio information. This prior art invention is disclosed in EP 0,670,555 A1.

FIG. 1 of the accompanying drawing schematically illustrates the physical format to be used for a dot code 10 of the proposed dot code system. The dot code 10 comprises a plurality of blocks 12 arranged two-dimensionally on a side by side basis. Each block 12 comprises a data area 14, a pattern code 16, markers 18 and a block address 20. The data area 14 contains a number of white dots 22 and black dots 24 representing so many "0s" and "1s" that are assigned to each block of error correcting code data including information data that may be audio information. As a matter of fact white dots are not recorded because the printing medium is a white medium. The pattern code 16 is used to locate the reference point for detecting each of the dots 22, 24 in the data area 14. The markers 18 are black markers arranged at the four corners of the block 12 so that the pattern code 16 may be detected. The block address 20 is used to identify the block when a plurality of blocks are read as block images and contains an error detecting or error correcting code.

For a more detailed description of dot code 10, refer to the above cited EP 0,670,555 A1.

The dot code 10 having the above described physical format is then printed by means of a printing machine that may be selected from a variety of printing machines of different types and different systems under various different printing conditions that are defined in terms of various printing materials including paper and ink to be used for the printing and the mode of regulating and controlling the printing machine. Therefore, the printed dot code has to be of a stable and good quality so that it may be read reliably by a code image reader of a specified type under any harsh conditions. This is the reason why a dot code of the type under consideration has to be checked for its quality.

Meanwhile, known bar codes are normally checked for the quality of printing by observing the strengths, the widths and the intervals of the bars. Printing press machines and other printers for printing bar codes are normally equipped with a bar code checking apparatus of a type as disclosed in Jpn. Pat. Appln. KOKAI Publication No. 5-77530 so that the quality of the printed bar code may be checked automatically.

While it may be desirable to check all the printed matters for quality, a sampling and checking system of extracting samples out of a given set of printed matters and checking them for the quality in order to reliably control the quality of all the printed matter is popularly known. This technique is advantageous in terms of cost when compared with the process of checking all printed matters on a one by one basis and hence also popularly used for printed matters carrying photographs therein in order to check the quality of the photographs. In the case of a sheet-feed press for offset printing, the printing operation normally proceeds at a rate of about 10,000 sheets per hour. The quality of the printed photographs in the printed sheets is checked either by picking up sample sheets and examining only part of the photographs on the sheets or by measuring the density of a predetermined pattern formed by scattered elements on the margins of the sampled sheets by means of a densitometer. In either case, sample sheets are extracted from the entire printed sheets and examined only partly to determine the quality of all the printed sheets. This quality check technique is feasible because, in ordinary printing, the quality of the printed photographs would not significantly vary by every several sheets.

Thus, it will be a good idea to combine the above-described bar code checking system and the sampling technique and apply them to a dot code checking system. Then, the values (density, size and dot interval) characterizing the dots and the markers of the dot code carried on a sampled sheet will be measured to determine the quality of all the dot codes printed on all the sheets of paper to be examined for quality.

However, for applying the technique disclosed in Jpn. Pat. Appln. KOKAI Publication No. 5-77530 to dot codes, there is required an image analyzing apparatus comprising an image pick-up section and an image analyzing section for analyzing the contour and the density of the dots and other components of the image data sent from the image pick-up section. Then, the image pick-up section is required to pick up the image of an entire code with a level of resolution that allows the image analyzing section to analyze the profiles of the dots of the code. Such an apparatus will inevitably be bulky and costly. Additionally, since a dot code typically comprises a large number of dots and markers, it will take too much time for an ordinary image analyzing apparatus to analyze the profile and the density of the dots and the markers. Therefore, the use of an ordinary image analyzing apparatus for the examination of the quality of dot codes will be unrealistic.

Since a dot code 10 as shown in FIG. 1 comprises error correcting code data as information data to be printed and recorded, an error state display apparatus for digital data signals as disclosed in Jpn. Pat. Appln. KOKOKU Publication No. 63-33748 may alternatively be used for checking the quality of such dot codes. The disclosed error state display apparatus is designed to display the number or errors that have not been corrected as a result of an error correcting processing operation. Such an error state display apparatus eliminates the use of a bulky image pick-up apparatus as discussed above and hence can reduce the cost of dot code quality check operation.

However, there arises another problem that makes it very difficult to use such an apparatus for dot code quality check operations. The error correcting code data to be printed and recorded including information data are indispensably required to have the error correcting ability adapted to dot code read errors that are attributable to at least the quality of the dot code being read, the performance of the read apparatus and/or the undefinable reading conditions given rise to by manual scanning operation. Therefore, the error correcting ability of the error correcting code data including information data is such that no error will be left after the error correcting operation conducted during the operation of reading a dot code under normal reading conditions.

However, it is impossible for an error state display apparatus as disclosed in Jpn. Pat. Appln. KOKOKU Publication No. 63-33748 to display the number of errors if it is used for a dot code quality check operation and hence is not suitably adapted to such an operation. Note that, for the purpose of the invention, "printing and recording" refers to not only normal offset printing and letterpress printing but also thermal transfer recording, ink-jet recording and other recording.

As described above, a code image to be read by manual scanning is provided with the ability to correct errors more than satisfactorily.

This will be discussed further by referring to FIGS. 2A through 3C.

FIG. 2A is a graph showing the relationship between scanning operation and code image read errors, where the scanning operation is manually conducted in an undefinable manner. Read errors increase as the scanning operation becomes not good due to an inclined, floating and/or rolling code image reader and/or a too high or low scanning rate. The hatched area 26 in FIG. 2A covers normal scanning operations that are typically conducted by ordinary users. P1 in FIG. 2A denotes the point corresponding to the worst scanning operation on the part of the user. In other words, most users perform better than the worst scanning operation. Note that the code image reader is a given apparatus operating as reference for scanning operation and the code image is a give image to be used as reference for quality check.

FIG. 2B is a graph showing the relationship between the performance of code image readers and code image read errors. Read errors increase. as the performance of the code image reader falls. The hatched area 28 in FIG. 2B shows the service provided to the user by code image readers. P2 in FIG. 2B denotes the point corresponding to the code image reader that operates as reference or the worst performing code image reader that can provide service to the user. The scanning operation of the code image reader at this point is the worst scanning operation conducted by the user and the code image is the one that operates as reference for a given quality check.

FIG. 2C is a graph showing the relationship between the quality of code image and code image read errors. Read errors increase as the quality of code image falls. The hatched area 30 in FIG. 2C shows the service provided to the user by code images. P3 in FIG. 2C denotes the point corresponding to the code image that operates as reference. The code image at this point is the code image of the worst quality that can be provided to the user. The code image reader used at this point corresponds to the one that operates as reference for the user and the scanning operation conducted by the user corresponds to the worst scanning operation.

FIG. 3A is a schematic illustration showing the relationship among the quality of code image, the performance of the code image reader and the fashion of manual scanning. The cuboid 32 shown in FIG. 3A is defined by the lengths of three edges directed perpendicularly relative to each other, or the length of a first edge representing the quality of the code image, that of a second edge representing the performance of the code image reader and that of a third edge representing the fashion of manual scanning. Assuming that the cuboid 32 is a cubic measure, then the volume of water 34 that can be contained in the cubic measure represents the number of code image read errors that will occur in the operation of reading a dot code image.

FIGS. 3B and 3C are illustrations showing the relationship between the originally provided error correcting ability and the code image read errors, supposing the scanning operation is manually conducted. The originally provided error correcting ability is represented by the volume of the cup 36 shown in FIG. 3B and that of the cup 38 shown in FIG. 3C. In FIG. 3B, reference numeral 40 denotes the read errors when the code image is checked by the best scanning operation of the code image reader and reference numeral 42 denotes the read error increment that arises when the code image is checked by the worst scanning operation of the code image reader. Reference symbols 40A, 40B and 40C respectively denote the read errors attributable to the code image reader, those attributable to the code image to be checked, and those that occur by the best scanning operation of the code image reader.

The cup 36 of FIG. 3B has a volume greater than the measure (cuboid 32) of FIG. 3A. Therefore, when the water 34 in the measure is poured into the cup 36, no water would flow out from the cup 36. This means that the originally provided error correcting ability has a margin for accommodating the difference 42 of between the errors of the worst scanning operation and that of the best scanning operation. Thus, in most cases, no water would flow out of the cup to signify that the number of errors left after the error correcting operation will be equal to "0" and the code image reader can substantially exactly reproduce the original error correcting code data.

It will be apparent from the above description that an error state display apparatus disclosed in Jpn. Pat. Appln. KOKOKU Publication No. 63-33748 and adapted to display the number of errors that could not be corrected by an error correcting operation cannot be applied to a code image quality check operation to be achieved by the present invention.

On the other hand, the cup 38 of FIG. 3C has a volume smaller than the measure (cuboid 32) of FIG. 3A. Therefore, when the water 34 in the measure is poured into the cup 38, water would eventually flow out from the cup 38. This means that the originally provided error correcting ability does not have any margin for accommodating the difference 42 of between the errors of the worst scanning operation and that of the best scanning operation. Thus, the original error correcting code data would not be reproduced exactly. It will be appreciated that an error state display apparatus disclosed in Jpn. Pat. Appln. KOKOKU Publication No. 63-33748 is designed to measure the amount of water that has flow out of the cup 38 and is adapted to check the quality of a code image reader or a code image recording medium by measuring the amount of water 46 contained in the cup 44.

As discussed above, the code image read errors that occur when a code image is read by a code image reader are generally defined in terms of the quality of the code image, the performance of the code image reader and the fashion of manual scanning, of which the fashion of manual scanning is dependent on the user and hence out of control of the manufacturer. Therefore, there is required a code image check method for reliably controlling the quality of a code image and the performance of a code image reader in order to allow the user to reliably scan an code image with a predetermined level of freedom of operation.

The term code image read error as used herein refers to the difference between an original error correcting code data to be correctly printed and recorded and the corresponding error correcting code data including information data obtained by printing and optical reading.

BRIEF SUMMARY OF THE INVENTION

In view of the above circumstances, it is therefore an object of the present invention to provide a code image quality check apparatus that can reliably examine the quality of a lot of code images being printed in a simple manner by sampling without requiring an image pick-up section and an image analysis section that are cumbersome and costly even if there are no uncorrected errors left after the error correcting operation.

Another object of the present invention is to provide a code image reader for reading a code image whose code reading performance can be checked easily from outside.

According to a first aspect of the present invention, there is provided a code image quality check apparatus adapted to check the quality of a code image printed and recorded on a printing medium as an optically readable image of error correcting code data containing information data including at least one of audio information, video information and digital data and adapted to be optically read by a manual scanning operation, the error correcting code data being provided with the ability to correct code image read errors attributable at least to one of the quality of the code image, the performance of the code image reader and the undefinable reading conditions resulting from the manual scanning operation, the code image quality check apparatus comprising:

read means for picking up and optically reading the code image;

restoration means for restoring the original error correcting code data from the code image read by the read means;

read error extraction means for extracting code image read errors from the data collected and unprocessed for error correction for the error correcting code data restored by the restoration means;

counter means for reducing the read errors extracted by the read error extraction means into numerical values and counting them, using a predetermined unit; and notification means for indicating the numerical values obtained by the counter means in a predetermined mode of notification.

The term code image read error as used in the description of the first embodiment refers to the difference between an original error correcting code data to be correctly printed and recorded and the corresponding error correcting code data including read and restored information data in the form of at least audio information, video information or digital data obtained by printing and optical reading. In the description of the second embodiment, it refers to an error produced as a result of an error detecting operation conducted on the demodulated data.

According to a second aspect of the present invention, there is provided a code image quality check apparatus adapted to check the quality of a code image printed and recorded on a printing medium as an optically readable image of error correcting code data containing information data including at least one of audio information, video information and digital data and adapted to be optically read by a manual scanning operation, the error correcting code data being provided with the ability to correct code image read errors attributable at least to one of the quality of the code image, the performance of the code image reader and the undefinable reading conditions resulting from the manual scanning operation, the code image quality check apparatus comprising:

read means for picking up and optically reading the code image;

restoration means for restoring the original error correcting code data from the code image read by the read means;

read error extraction means for extracting code image read errors from the data collected and unprocessed for error correction for the error correcting code data restored by the restoration means;

read error location detection means for detecting the respective locations of the code image read errors extracted by the read error extraction on the code image; and display means for displaying the locations of the errors detected by the read error location detection means.

According to a second aspect of the present invention, there is provided a code image reader comprising:

read means for picking up and optically reading a code image printed and recorded on a printing medium as an optically readable image of error correcting code data containing information data including at least one of audio information, video information and digital data and adapted to be optically read by a manual scanning operation;

restoration means for restoring the original error correcting code data from the code image read by the read means;

error correction processing means for processing the error correcting code data restored by the restoration means for error correction; and output means for externally outputting the data processed for error correction by the error correction means, wherein the error correcting code data is provided with the ability to correct code image read errors attributable at least to one of the quality of the code image, the performance of the code image reader and the undefinable reading conditions resulting from the manual scanning operation; and the code image reader further comprises interface means for outputting one of the error correcting code data read by the read means and restored by the restoration means and the code image data read by the read means to an external check device for checking the performance of the code image reader from the viewpoint of code image read errors.

Additional objects and advantages of the invention will be set forth in the description which follows; and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 2A is a graph showing the relationship between scanning operation and code image read errors.

FIG. 2B is a graph showing the relationship between the performance of code image readers and code image read errors.

FIG. 2C is a graph showing the relationship between the quality of code image and code image read errors.

FIG. 3A is a schematic illustration showing the relationship among the quality of code image, the performance of code image reader and the fashion of manual scanning.

FIGS. 3B and 3C are illustrations showing the relationship between the originally provided error correcting ability and the code image read errors.

DETAILED DESCRIPTION OF THE INVENTION

Now, the present invention will be described by referring to the accompanying drawings that illustrate preferred embodiments of the invention.
(1st Embodiment)

Figure 1:
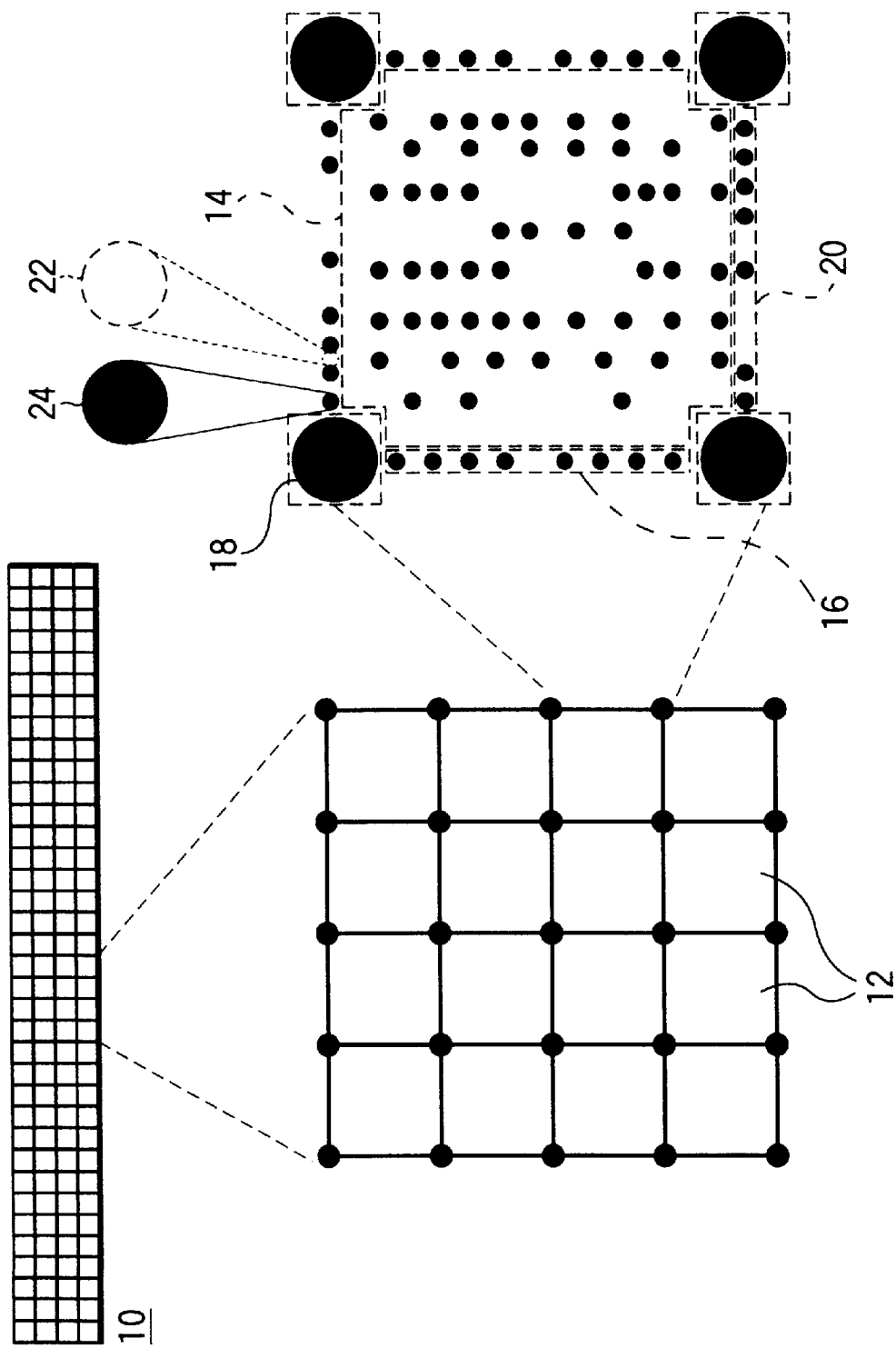
FIG. 1 is a schematic illustration of a dot code, showing its physical format.

In this embodiment, a dot code as shown in FIG. 1 is used as code image to be read by manually scanning it entirely by means of a code image reader to detect and process read errors per dot in order to determine the dot error rate and display it on the monitor screen to notify the user of it. The dot error rate is an index for showing the quality of the dot code being examined so that the user may be constantly provided with high quality dot codes on a stable basis by controlling the dot error rate and the inconvenience of unable reproduction of the dot code being read by a code image reader may be eliminated.

Figures 4, 6, 8:
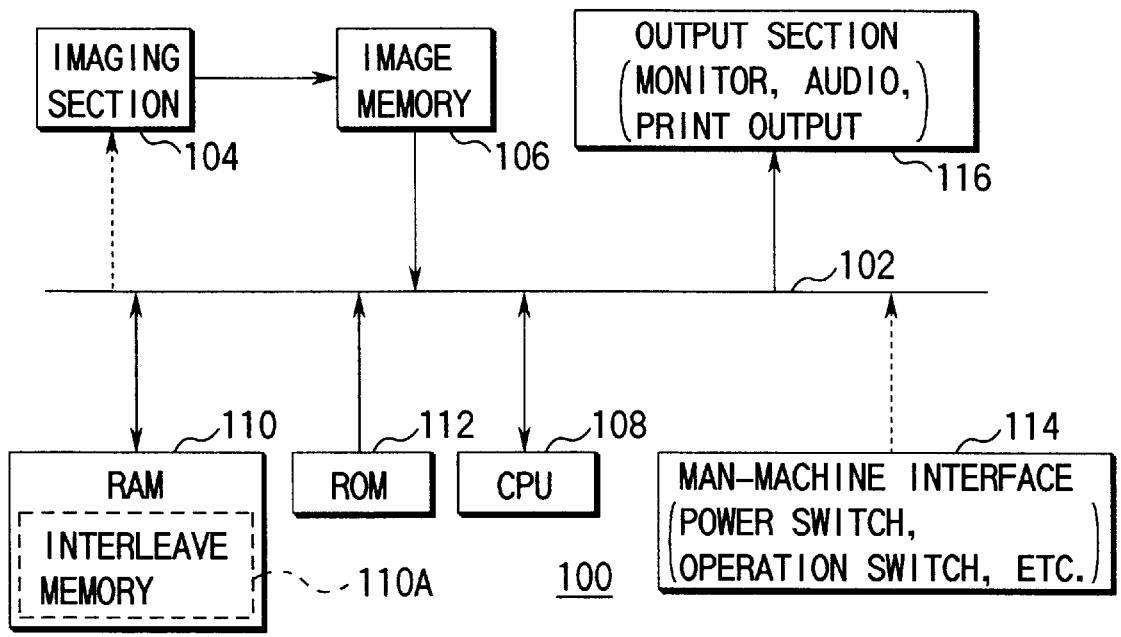
FIG. 4 is a schematic block diagram of a first embodiment of code image quality check apparatus according to the invention.
FIG. 6 is an exemplary image that can be displayed on the display screen of the first embodiment of code image quality check apparatus.
FIG. 8 is an exemplary image that can be displayed on the display screen of the second embodiment of code image quality check apparatus.

Referring to FIG. 4, the code image quality check apparatus 100 of this embodiment comprises an image pick-up section 104, an image memory 106, a CPU 108, a RAM 110, a ROM 112, a man-machine interface 114 and an output section 116 connected to a CPU bus 102. In FIG. 4, the solid lines indicates represent data while the broken lines represent control signals. The arrows in FIG. 4 indicate the directions in which data and control signals proceed. Note that only principal control signals are shown.

The image pick-up section 104 is designed to illuminate a dot code 10 and receives the light reflected by the dot code to read the latter and transform it into a corresponding set of image data. The image memory 106 stores the image data. The CPU 108 carries out processing operations according to the program given to it and controls the components and the overall operation of the apparatus.

The RAM 110 temporarily stores all intermediary data including the data obtained as a result of the processing operations of the CPU 108 carried out on the above image data and the data to be sent to the output section 116 as well as control data. For example, the intermediary data typically include error correcting code data including information data that may be audio information. The ROM 112 stores the program of the CPU 108 and also various parameters and table data.

The man-machine interface 114 comprises a switch section having switches to be used for supplying power and for receiving the instructions given by the user to operate the apparatus. The output section 116 typically comprises a loud speaker and a monitor screen for outputting respectively audio and video information that may be contained in the original information data obtained by the restored error correcting code data as well as a printer for printing and recording the output.

Now, the operation of the CPU 108 of the code image quality check apparatus 100 of this embodiment will be described by referring to the flow chart of FIG. 5.

Firstly, when the power switch of the switch section of the man-machine interface 114 is turned ON, the code image quality check apparatus 100 is initialized (Step S10 ). As a result of the initialization, the RAM 110 and the image memory 106 will be checked and/or cleared while the LED of the lighting system of the image pick-up section 104 will be turned off and the operation of the image pick-up device will be checked. The output section 116 will also be initialized so that the display screen will be cleared and the audio output will be made silent.

Then, it is checked if the operation switch of the man-machine interface 114 is depressed and turned ON by a user's instruction (Step S12). If the operation switch is ON, the processing operation proceeds to the next step whereas, if it is not, Step S12 will be repeated to remain in a stand-by state.

Thereafter, the CCD that is the image pick-up device of the image pick-up section 104 and the LED of the lighting system are driven to fetch an image (Step S14). Then, markers 18 of the dot code 10 in the fetched image as shown in FIG. 1 will be detected and then pattern code 16 will be detected by referring to the coordinate of the center of each of the detected markers 18 to recognize block 12 as part of the dot code 10 and then the read reference point that provides the reference coordinate for detecting dots 22, 24 in the data area 14 will be detected (Step S16). Thereafter, the portion of the block address 20 relating to the recognized block 12 will be detected and the block address of the block will be detected from the detected portion of the block address 20 and stored in the RAM 110 as fetched block address (Step S18). Subsequently, the dot arrangement information telling if each of the dots contained in the data area 14 as shown in FIG. 1 and detected according to a predetermined dot arrangement order is white or block will be detected as value "0" or "1" respectively to restore the original error correcting code data including information data and then the memory address on the RAM 110 will be determined from the information on the location of each of the dots corresponding to the restored value and the detected block address so that the error correcting code data representing the dot arrangement information will be stored at the memory address (Step S20). Then, the value of the dot arrangement information detected in Step S20 and that of the original and ideal dot arrangement information to be printed and recorded that is stored in ROM 112 in advance are compared to detect discrepant dots (an operation corresponding to that of extracting code image read errors) and the number of the detected discrepant dots will be counted (Step S22). Then, if the operation switch remains in the depressed state or not is checked (Step S24) and, if it is still in the depressed state, the processing operation returns to Step S14 to fetch the next image so that the steps down to Step S22 will be repeated.

If it is found in Step S24 that the operation switch is no longer in the depressed state, the fetched block addresses fetched and stored in the RAM 110 will be counted to determine the total number thereof and the total number of blocks of the dot code to be printed and recorded will be detected from the original dot arrangement information on the ROM 112 (Step S26). The total number of blocks as used herein refers to the total number of block addresses recorded in the dot code that are different from each other. While the total number of blocks is detected from the original and ideal dot arrangement information to be printed and recorded when the dot code is recorded in this embodiment, it may alternatively be so arranged that the dot arrangement information contains parameter information that can be used to determine the total number of blocks and the total number of blocks is determined by extracting the parameter information from the read out dot arrangement information.

Subsequently, the ideal total number of blocks and the total number of blocks that have been actually fetched will be displayed on the output section for the dot code (Step S28). It may alternatively be so arranged that the ratio of the total number of fetched blocked addresses to the ideal total number of blocks is determined and displayed as read out block ratio.

The total number of fetched block addresses and the ideal total number of blocks should agree with each other to realize a read out ratio of 100%. However, if the ratio is not equal to 100%, it suggests that either the dot code scanned and examined by the quality check apparatus 100 is defective or the scanning operation is defective. Therefore, if the ratio is not equal to 100% when the dot code is scanned properly under good conditions, it indicates that the dot code itself is defective. Thus, the quality of each dot code can be checked on the basis of the fetched block addresses and also any improper scanning can be detected by the quality check operation. Then, if a standardized system is used for expressing the result of each dot code quality check, the error rate per dot can be displayed on the output section by determining the ratio of the number of discrepant dots to the total number of dots calculated from the ideal total number of blocks (Step S30). Thus, the processing operation of the flow chart will be terminated.

FIG. 6 shows an exemplary image that can be displayed on the display screen of the output section at Step S30, where the determined ratio is expressed as dot error rate in %. The dot error rate is the value representing the result of the evaluation made on the basis of the error correcting code data that directly corresponds to the dots obtained immediately after they are read by the code image reader. Since it is not accompanied by processing operations to be conducted after being read and hence does not involve computational errors. Therefore, it is free from errors due to demodulating operations such as those where a plurality of dot errors are combined into one or a single error is split into a plurality of errors so that the quality of the printed dot code can be accurately and reliably determined. Additionally, the error rate can be determined accurately and reliably even when there are too many errors to be corrected by an error correcting operation.

In the example of FIG. 6, the total number of fetched block addresses and the ideal total number of blocks obtained in Step S28 are displayed as the total number of fetched blocks and the total number of blocks. In the illustrated example, the total number of fetched blocks and the total number of blocks are equal to "66" and "68" respectively. Then, the number of unfetched blocks can be determined with ease. If the dot code is scanned properly and unfetched blocks exist nevertheless, then the problem of unfetched blocks will be mostly attributable to the defective quality on the part of the dot code. Thus, any defective dot code can be detected by the above processing operation. The problem of unfetched blocks and hence that of a defective code can be given rise to by a fault on the part of any of the markers 18, the pattern code 16 and the block address 20.

(2nd Embodiment)

Now, a second embodiment of code image quality check apparatus according to the invention and its operation will be described by referring to the flow chart of FIGS. 7A and 7B.

This embodiment of code image quality check apparatus has a configuration same as that of the first embodiment shown in FIG. 4 and hence will not be described here any further. The Steps S10 through S18 in FIGS. 7A and 7B are identical with their counterparts of FIG. 4 and hence will not be described here either.

After the processing steps from Step S10 through Step S18, the memory address on RAM 110 is determined by computation on the basis of the block address of the detected block and the locational information on the dots corresponding to the read and restored values and the error correcting code data is demodulated as dot arrangement information restored by the dot reading operation, which will then be stored in the memory address of the interleave memory 110A mapped on the RAM 110 (Step S40).

The above demodulating operation will be described in greater detail. In order to accurately discriminate the markers 18 and the dots in the data area 14 during the dot code reading operation, the number of consecutive black dots 24 in the data area 14 should be limited. Therefore, for example, an operation of 8–10 modulation will be conducted on the error correcting code data including information data at the time of printing and recording. Thus, the original 8-bit error correcting code data has to be restored from the 10-bit error correcting code data obtained by the 8–10 modulation at the time of dot reading operation by means of a 10–8 demodulating operation. However, it should be noted that modulation is not an indispensable requirement of a printing and recording operation, which may be conducted without modulation but with some other process. What is important here is that a code image that has been processed has to be reversely processed when it is read so that it may be finally printed and recorded.

Figure 7A:
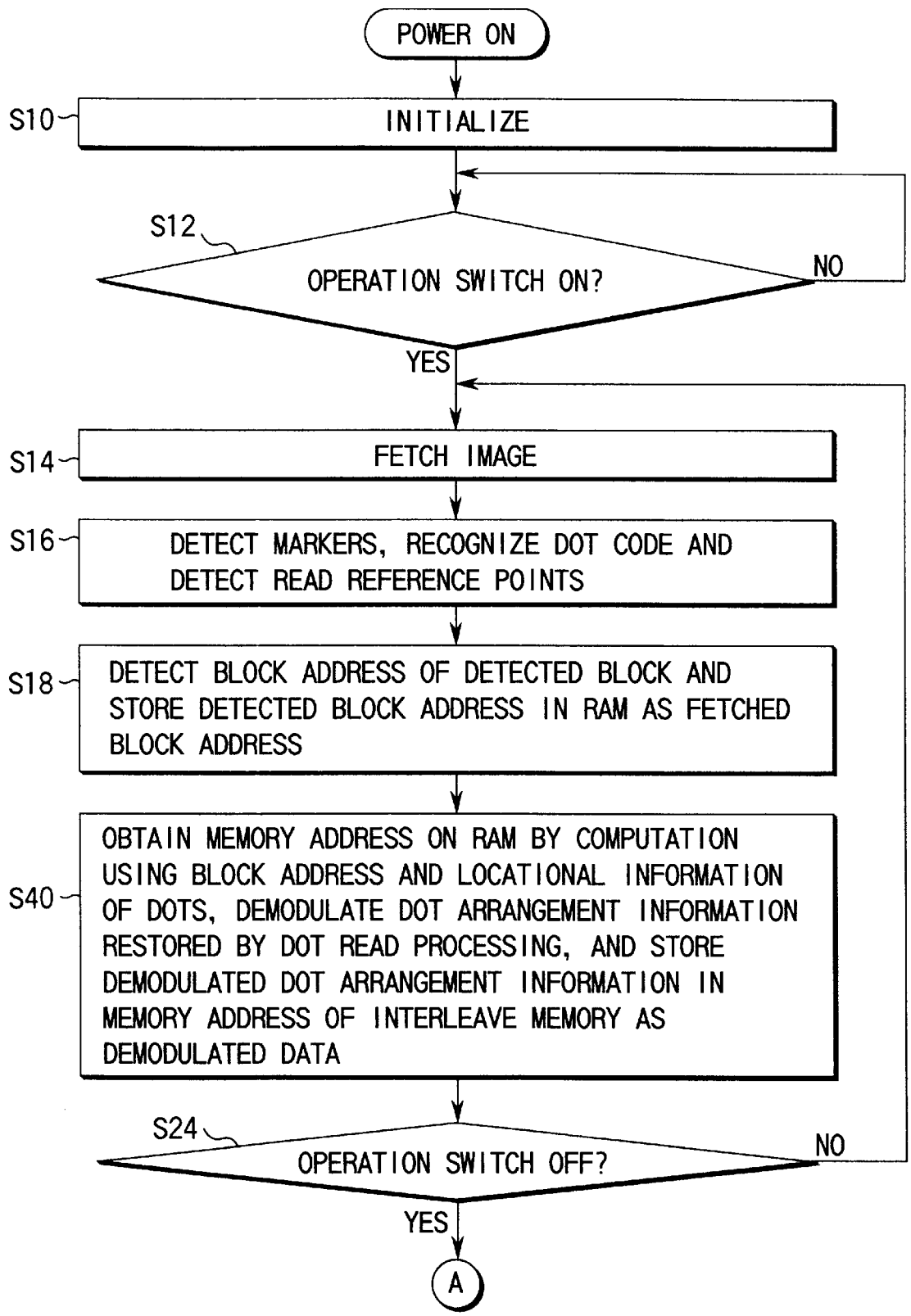
FIGS. 7A and 7B are flow charts for the operation of determining the error rate of a code image, using an error correcting code, of a second embodiment of code image quality check apparatus according to the invention.
Figure 7B:
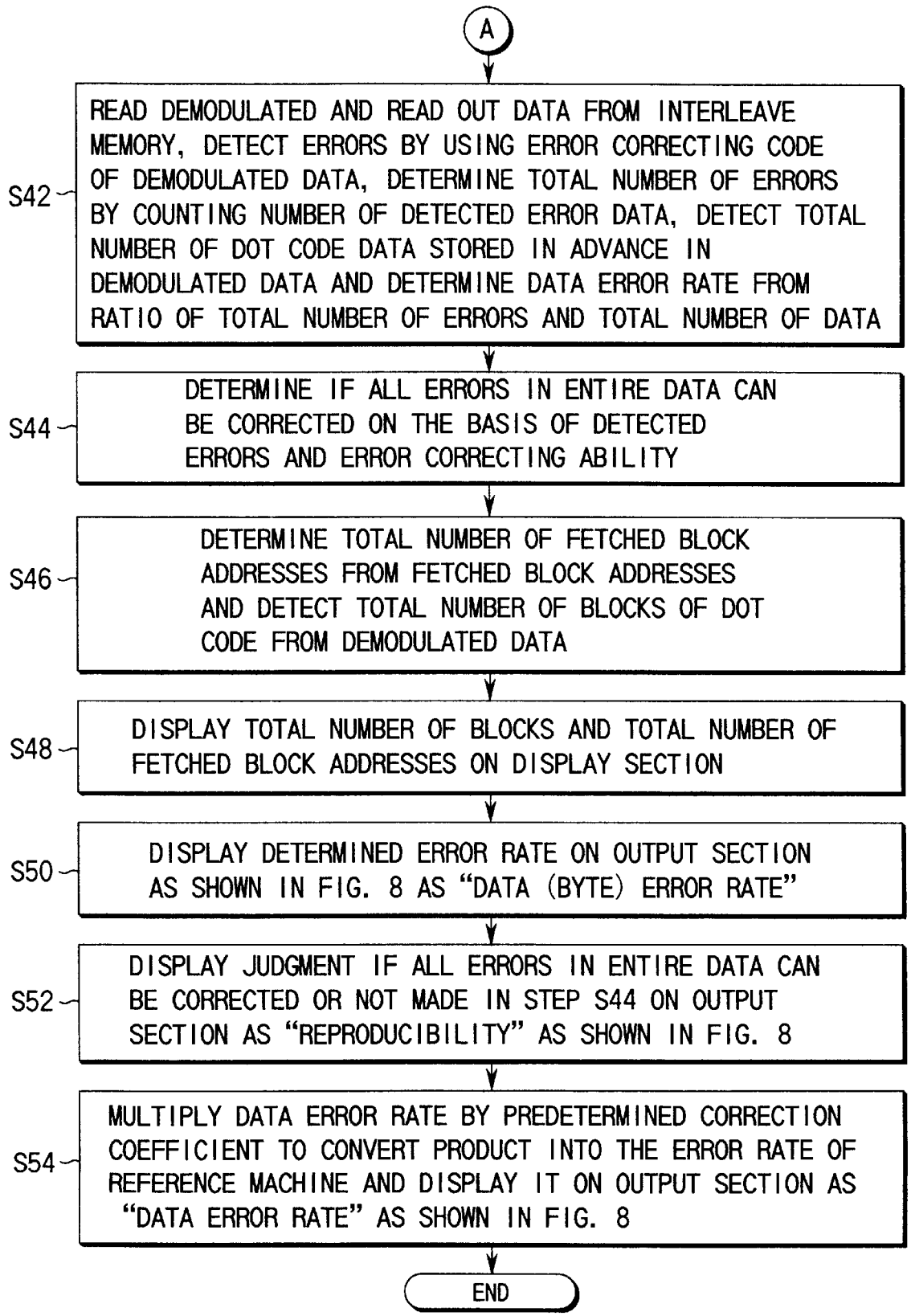

Returning back to the flow chart of FIGS. 7A and 7B, then it is checked if the operation switch of the man-machine interface 114 is depressed or not (Step S24) and, if it is found that the switched in the depressed state, the operation returns to Step S24 to fetch the next code image and Steps S14 through S40 will be repeated.

If, on the other hand, it is found in Step S24 that the operation switch is no longer in the depressed state, then the operation of Step S42 will be performed. Firstly, the read and demodulated error correcting code data is read out from the interleave memory 110A and an error detecting operation is conducted, using the check parity data contained in the demodulated data, to determine the total number of errors and hence the number of errors that occurred in the code image reading operation from the error detection data. Note that the error correcting code data is provided with a high error correcting ability by using a long code length like (88, 72) Reed-Solomon code and a large volume of parity data. The total number of dot code data recorded in advance in the demodulated data will also be detected from the demodulated data. Then, the data error rate will be determined from the total number of errors and the total number of data.

Figure 5:
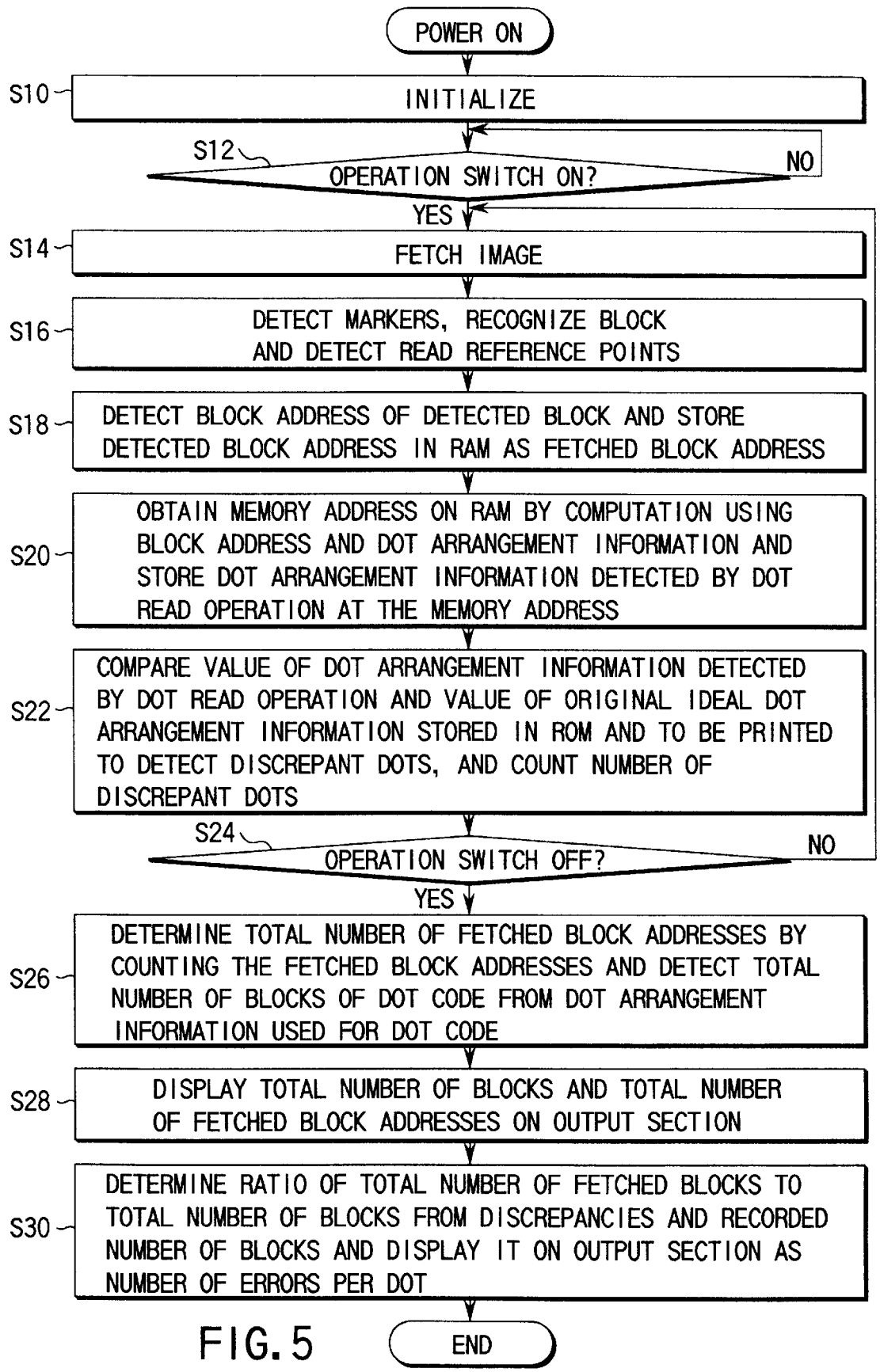
FIG. 5 is a flow chart for the operation of determining the error rate per dot of the first embodiment of code image quality check apparatus by comparing the information stored in advance in a ROM and the information obtained by reading the code image.

The original and ideal dot arrangement information is stored in advance in the ROM 112 in the flow chart of FIG. 5. However, in actually applications, a variety of dot codes will have to be printed and recorded and hence pieces of original and ideal dot arrangement information, the number of which corresponds to the number of dot codes to be printed and recorded, will have to be selected and stored in the ROM 112 in advance. To the contrary, with this second embodiment, no original and ideal dot arrangement information is stored in advance in the ROM 112 of the quality check apparatus and the data error rate is determined from the error correcting code data read out for each dot code to be checked so that any dot codes can be checked efficiently and effectively at the printing site without imposing any limitations on the dot code to be checked.

When the data error rate is determined, it is then determined if all the errors in the data can be corrected or not on the basis of the detected errors and the error correcting ability of the apparatus (Step S44). Then, the total number of the fetched block addresses will be counted and the total number of blocks in the dot code will be detected from the read error correcting code data (Step S46). Then, the total number of block and the total number of fetched block addresses are displayed on the output section 116 (Step S48) along with the determined error rate as "data (byte) error rate" as shown in FIG. 8 (Step S50). Then, the judgment if all the errors in the entire data can be corrected or not is displayed as "reproducibility" as shown in FIG. 8 on the output section 116 (Step S52). Thereafter, the data error rate is multiplied by a predetermined correction coefficient to reduce the error rate into the corresponding value of a code image quality check apparatus to be used as reference machine and the obtained value is displayed on the output section 116 as "reference machine error rate" as shown in FIG. 8 (Step S54) to terminate the operation of the flow chart.

The correction coefficient is determined as a function of the difference between the performance of the code image quality check apparatus to be used as reference machine and the currently operating code image quality check apparatus 100. Thus, as the error rate determined by the currently operating code image quality check apparatus 100 is multiplied by the correction coefficient, any error that can arise from the difference of performance between the currently operating code image quality check apparatus 100 and the code image quality check apparatus to be used as reference machine can be corrected to express the error rate in standardized terms. Now, the method of determining the correction coefficient will be described by referring to FIGS. 9A and 9B.

To begin with, a predetermined dot code is read by both the quality check apparatus acting as reference machine and the currently operating quality check apparatus as calibration code and the data error rate is checked for the both apparatus. If the data error rate of the reference machine is A and that of the currently operating quality check apparatus is B, then the correction coefficient K is determined by equation (1) below.

$$\text{correction coefficient } K = A/B \quad (1)$$

Then, the data error rate B' obtained as a result of a check conducted by the currently operating quality check apparatus 100 on the dot code to be examined is used to determine the corrected data error rate C by equation (2) below.

$$\text{corrected data error rate } C = B'^* K \quad (2)$$

Figure 9A:
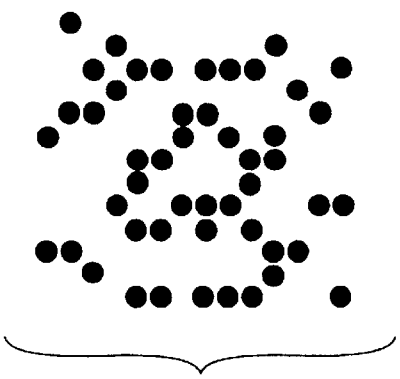
FIGS. 9A and 9B are illustrations showing a method of determining a correction coefficient for a code comprising dots having an identical contour and for a method for a code comprising dots having different contours.

In the case of a satisfactorily printed dot code as shown in FIG. 9A, all the dots have a substantially identical contour and the error rate can be minimized. However, when a dot code that is printed well with a minimized error rate is checked by a plurality of quality check apparatus that perform differently, they will produce a substantially same error rate to make the correction coefficient obtained by means of equation (1) substantially equal to K=1 so that the differences in the performance of the quality check apparatus cannot be effectively corrected if they are used to read a dot code that is printed in a poor condition.

On the other hand, errors can occur frequently when a dot code that is printed in a poor condition is read. Then, the error rates obtained respectively by a plurality of quality check apparatus that perform differently will also show remarkable differences when the dot code is checked by such apparatus.

Therefore, if a dot code that shows a selected check reference value corresponding to the data error rate produced by the reference machine when it is read by the latter is selected as calibration code and the correction coefficient is determined by means of the equation (1) above, then the error rates obtained by a plurality of quality check apparatus that perform differently relative to the reference machine and relative to each other can be corrected reliably.

Figure 9B:
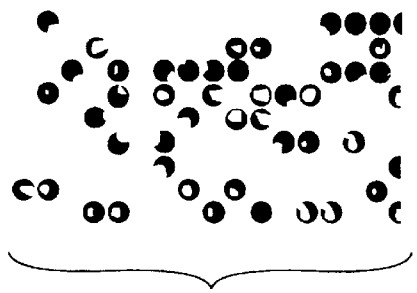

It may be difficult to reproduce a dot code showing a data error rate constantly conforming to that of a given check reference. However, the inventor of the present invention found as a result of intensive research efforts that a dot code can be reproduced reliably on sheets of printing paper with a high data error rate conforming to that of a given check by selecting an appropriate printing system or image setter if the dot code comprises a plurality of different dot patterns showing different images and made of dots having a contour as shown in FIG. 9B.

While a method of correcting the data error rate and a dot code to be used for determining the correction coefficient are described above, the above described method and dot code may be applied not only to the data error rate but also the dot error rate.

(3rd Embodiment)

Figure 10:
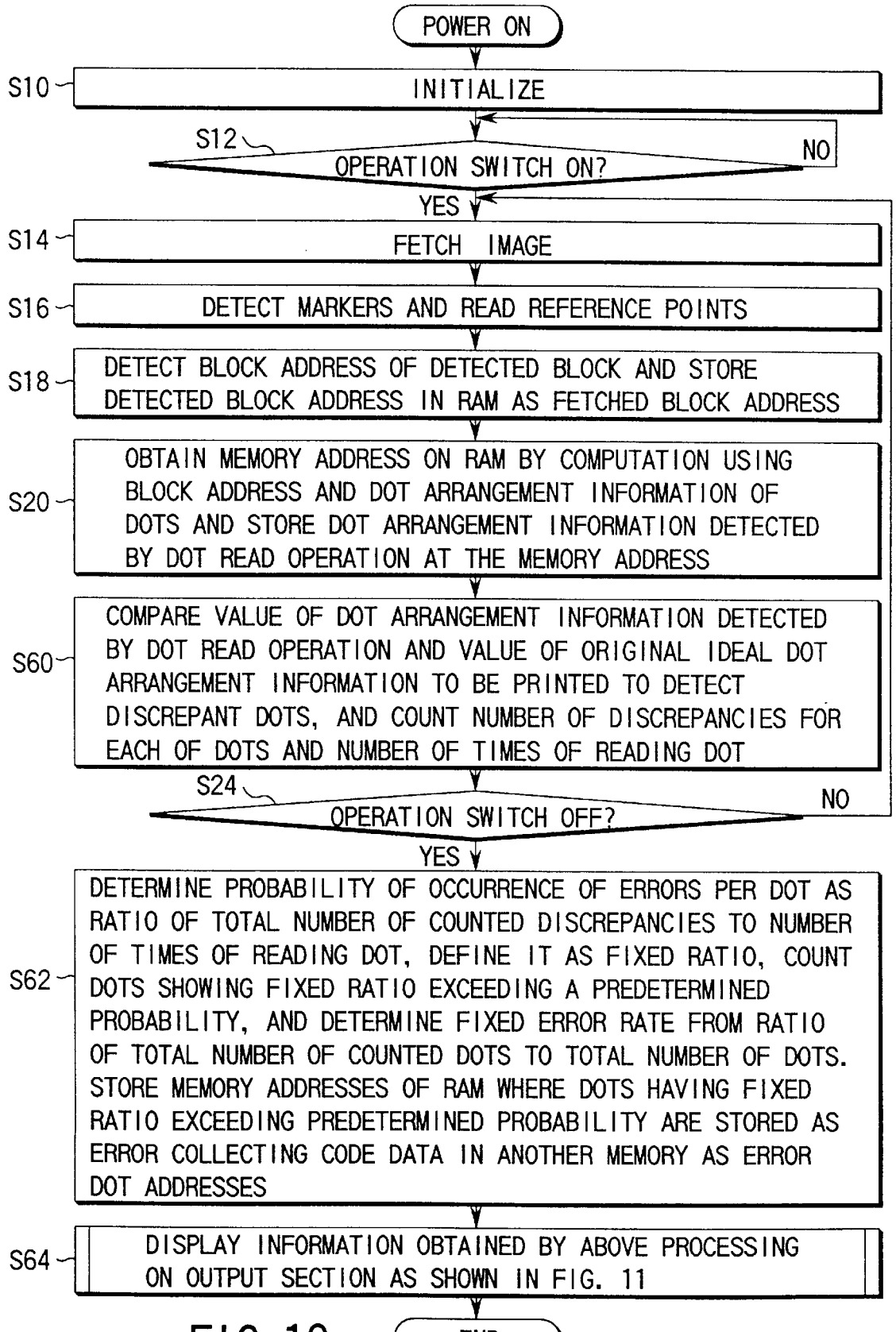
FIG. 10 is a flow chart of the operation of determining the fixed error rate of erroneously reading dots with a high degree of probability of a third embodiment of code image quality check apparatus.

Now, a third embodiment of code image quality check apparatus according to the invention and its operation will be described by referring to the flow chart of FIG. 10.

This embodiment of code image quality check apparatus has a configuration same as that of the first embodiment shown in FIG. 4 and hence will not be described here any further. The Steps S10 through S20 in FIG. 10 are identical with their counterparts of FIG. 5 and hence will not be described here either.

After the processing steps from Step S10 through Step S20, the value of the dot arrangement information detected in Step S20 and the value of the original and ideal dot arrangement information to be printed and recorded that is stored on the ROM 112 are compared and all discrepant dots are detected and the number of discrepancies at the position of each of the dots and the number of times the dot is read will be counted (Step S60). The processing operation in Step S60 goes as follows. The RAM 110 has a memory area for storing the number of discrepancies and the number of times the dot is read and these numbers of the two different types that are counted up to the last image fetched in Step S12 and stored in the RAM 110 are read out, to which the number of discrepancies detected this time and the number of times the dot is read this time will be added respectively. Note that these numbers of the two different types are equally set to "0" by the initialization in Step S10.

Then, the operation switch of the man-machine interface 114 is checked for the depressed state (Step S24) and, it if is found that the operation switch remains in the depressed state, the processing operation returns to Step S14 to fetch the next image and the Steps S14 through S60 will be repeated for another time.

If, on the other hand, it is found in Step S24 that the operation switch is no longer in the depressed state, the probability of occurrence of error is determined as the ratio of the counted total number of discrepancies to the number of times the dot is counted, which is defined as fixed ratio. Then, all the dots whose fixed ratios exceed a predetermined probability value are counted (an operation corresponding to the extraction of code image read errors) and then the fixed error rate is determined as the ratio of the counted number to the total number of dots. Then, the memory addresses on the RAM 110 where the error correcting code data of the dots having fixed ratios exceeding the predetermined probability are stored are detected as error dot addresses and stored in a different memory (Step S62). Then, the pieces of information obtained as a result of the processing operation in Step S62 are displayed on the output section 116 as shown in FIG. 11 (Step S64) to terminate the operation of the flow chart.

Figure 11:
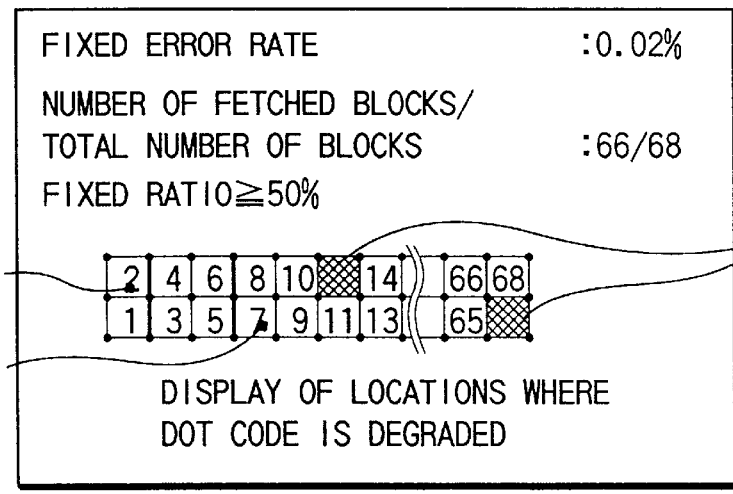
FIG. 11 is an exemplary image that can be displayed on the display screen of the third embodiment of code image quality check apparatus to notify the defectiveness of the original plate.

It will be appreciated that, in the example of FIG. 11, the fixed error rate in %, the total number of fetched block, the total number of blocks of the code and the predetermined probability.

While both the dot error rate and the data error rate as described above by referring to the first and second embodiments refer to errors that may be originating from the dot code or the dot code reader, the fixed error rate as used in this embodiment is an index that is highly dependent on the quality of the dot code. In other words, the fixed error rate will be effective for checking the quality of dot codes and particularly those on original plates that have to be checked rigorously for quality.

While the location of each of the dots having fixed ratios exceeding a predetermined probability may be displayed by using a coordinate system and the numerical values of the coordinate of the dot, the display of FIG. 11 schematically shows the dot code image, where defective dot 1 is indicated by locational index 118A, defective dot 2 is indicated by locational index 118B and so on so that the user (examiner) may easily identify the detective dots and their respective locations and take corrective measures.

Figure 12A:
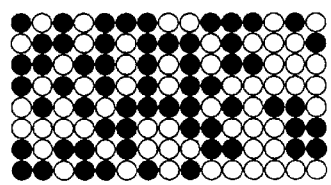
FIG. 12A is an enlarged view of ideal original dots to be printed and recorded.
Figure 12B:
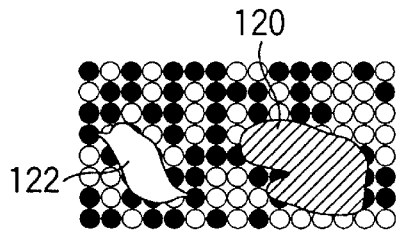
FIGS. 12B and 12C are enlarged views of dots including defective dots that can be produced by stains and scars.
Figure 12C:
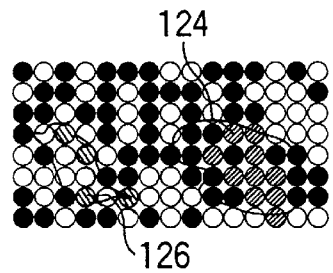
Figure 12D:
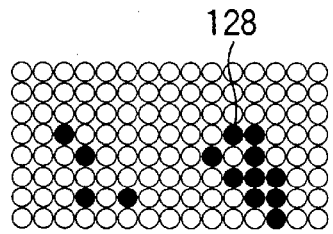
FIG. 12D is an enlarged view of dots showing error dots in black.

It is also possible to enlarge each of the defective areas of the dot code that may have been produced by stains and scars as shown in FIGS. 12A through 12D. These areas may be displayed simultaneously or on a time division basis on the display screen of the output section. More specifically, FIG. 12A shows an enlarged view of some of the original and ideal dots to be printed and recorded. On the other hand, FIGS. 12B and 12C show enlarged views of defective dots that may have been produced by stains and scars. More specifically, in FIG. 12B, reference numeral 120 denotes a black stain while reference numeral 122 denotes a pale stain. In FIG. 12C, reference numeral 124 denotes a white dot that is mistaken for black dot and reference numeral 126 denotes a black dot that is mistaken for white dot. In FIG. 12D, only the dots 128 that have been read erroneously are shown as black dots.

Figure 13:
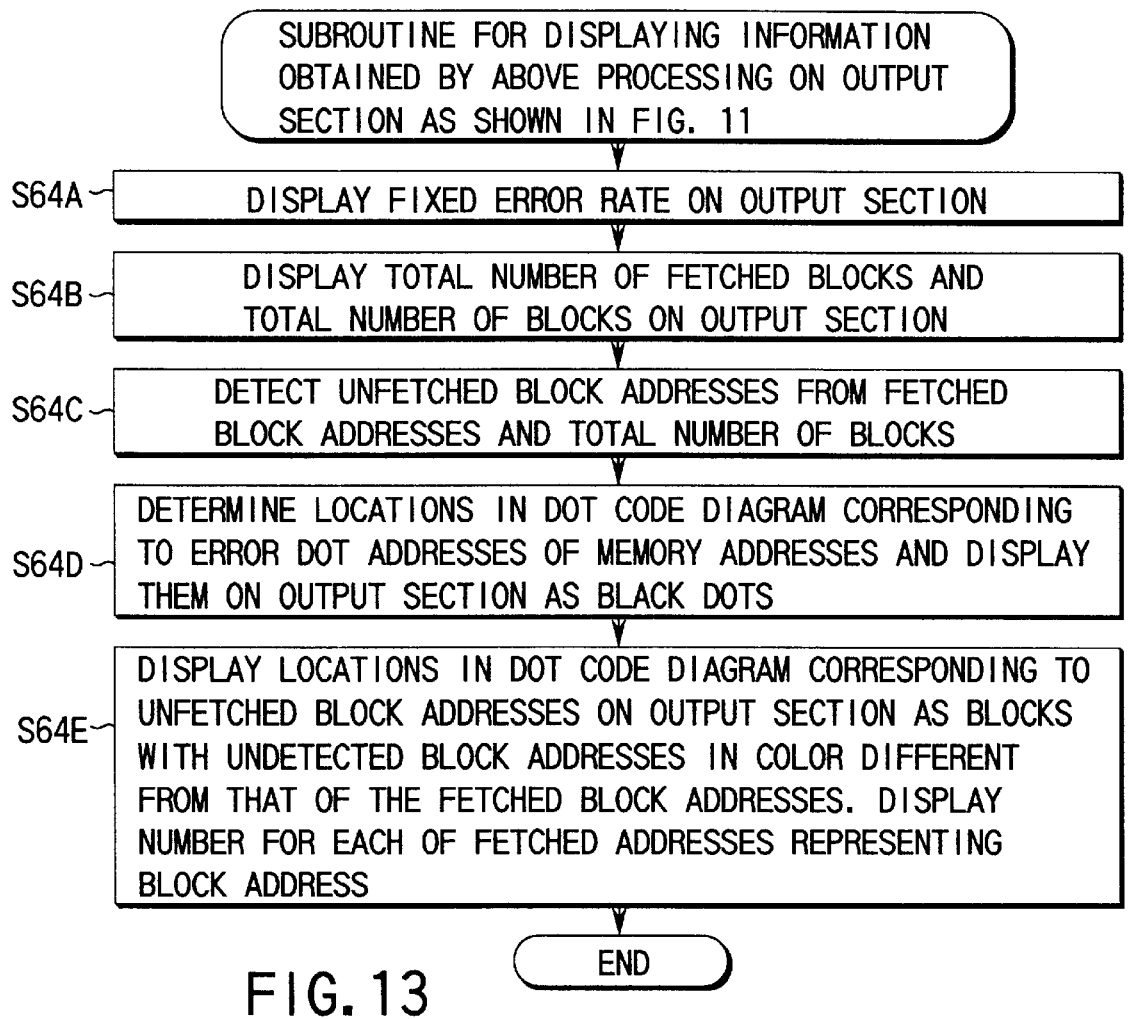
FIG. 13 is a flow chart for the sub-routine in Step S64 of the flow chart of FIG. 10.

The operation in Step S64 of the flow chart in FIG. 10 will now be described by referring to FIG. 13 showing a flow chart of the sub-routine of Step S64.

Firstly, the determined fixed error rate is displayed on the output section 116 (Step S64A). Then, the total number of fetched blocks and the total number of blocks are also displayed on the output section 116 (Step S64B). Then, the block addresses of the unfetched blocks are detected on the basis of the block addresses of the fetched blocks and the total number of blocks (Step S64C). Thereafter, the locations corresponding to the unfetched blocks are detected in the schematic view of the dot code in FIG. 11 on the basis of the memory addresses in the RAM 110 corresponding to the error dot addresses stored in the above mentioned different memory and displayed on the output section 116 as black dots (Step S64D).

Additionally, the blocks on the locations that correspond to the respective unfetched blocks are displayed in a color different from the color of the blocks corresponding to the fetched block addresses as blocks 130 whose block addresses are undetected as shown in FIG. 11. Then, the blocks on the locations that correspond to the respective fetched blocks are displayed with numerals representing their block addresses as shown in FIG. 11 (Step S64E) to terminate the sub-routine.

Locational indexes such as the locational index 118A indicating the defective dot 1 and the locational index 118B indicating the defective dot 2 in FIG. 11 are used in the schematic view of the dot code only for the dots whose fixed ratios exceed the predetermined probability, or the threshold, which can be selected and displayed by the user (examiner).

While the locations of the read errors in the extracted code image are displayed on the basis of dot errors in the embodiment, it may be alternatively so arranged that, as described above by referring to the second embodiment, the data errors obtained as a result of error detection operation are extracted as code image read errors, which are then displayed at corresponding respective locations.

In many cases, the original plate to be used for printing may be a film and printed copies are produced by optical printing, using the film, as in the case of photography. When the film of the original plate carries defects such as scars and fine pieces of dust when copies are printed, then all the printed copies will become defective. Particularly, if a defect is found on a dot of a dot code, the dot will inevitably give rise to a read error. Therefore, for preparing an original plate of film and printing copies, care should be taken to minimize stains and scars. However, with the method as described above by referring to the flow chart of FIG. 10, since all dots having a high fixed ratio and apt to give rise to read errors are detected in the dot code, they may be locationally identified with ease by means of a magnifier on the basis of the obtained locational information so that corrective measures including removing the stains can be taken without any problem. Additionally, the make of the original plate of film and/or that of the printed copies can be detected on the basis of the fixed error rate that is determined as the ratio of the dots a high fixed ratio and apt to give rise to read errors to the total number of dots to improve the quality of dot code printing. Furthermore, in addition to the detection of defects on the original plate of film and the printed copies, dots having a high fixed ratio and apt to give rise to read errors that can be produced by pieces of dust entering the printing site can also be checked.

(4th Embodiment)

An embodiment of code image reader according to the invention and adapted to reproduce and output the original sensible information that may be audio information out of a restored dot code will be herein referred to the fourth embodiment of the invention.

Figure 14:
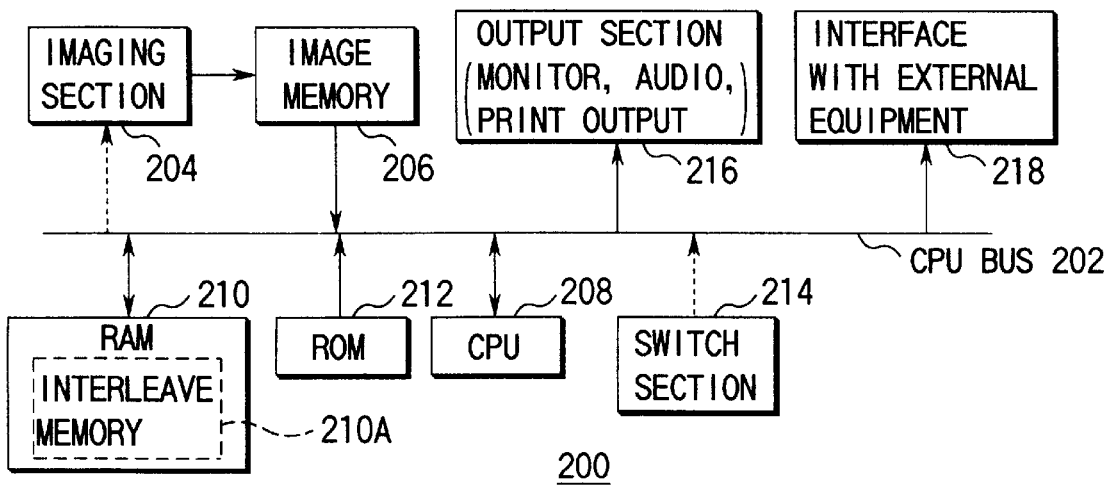
FIG. 14 is a schematic block diagram of a fourth embodiment of code image reader according to the invention.
Figure 15:
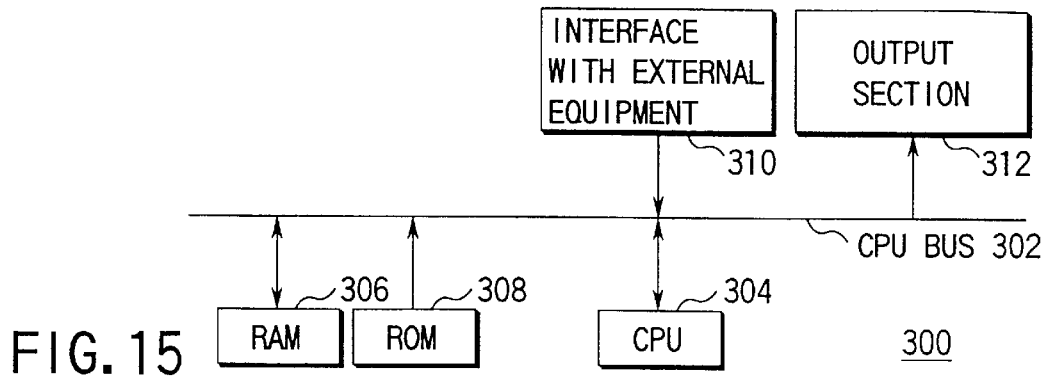
FIG. 15 is a schematic block diagram of an error rate evaluating device for examining the performance of the embodiment of code image reader and displaying the result of the examination.

FIG. 14 is a schematic block diagram of a code image reader 200 adapted to optically read a dot code and reproduce and output the original audio information. The code image reader 200 comprises an interface section for producing the read and restored error correcting code data or the data on the read code image to an external check device in order to check the code image for errors. FIG. 15 is a schematic block diagram of a check device (error rate evaluating device) for receiving the information produced by the interface section, checking the performance of the reader and displaying the result of the checking operation. The solid lines, the broken lines and the arrows in FIGS. 14 and 15 are used just as their counterparts in FIG. 4 and hence will not be described here any further.

Referring to FIG. 14, the code image reader 200 comprises an image pick-up section 204, an image memory 206, a CPU 208, a RAM 210, a ROM 212, a switch section 214, an output section 216 and an interface section 218 connected to a CPU bus 202. The image pick-up section 204 is designed to illuminate dot code and receives the light reflected by the dot transform it the latter and transform it into a corresponding set of image data. The image memory 206 stores the image data. The CPU 208 carries out processing operations according to the program given to it and controls the components and the overall operation of the apparatus. The RAM 210 temporarily stores all intermediary data including the data obtained as a result of the processing operations of the CPU 208 carried out on the above image data and the data sent to the output section 216 as well as control data. For example, the intermediary data typically include error correcting code data including information data that may be audio information. The ROM 212 stores the program of the CPU 208 and also various parameters and table data. The switch section 214 is used for the operator to give instructions to the apparatus including that of turning on the power source. The output section 216 typically comprises a loud speaker and a monitor screen for outputting respectively audio and video information that may be contained in the original information data obtained by the restored error correcting code data as well as a printer for printing and recording the output. The interface section 218 is used to transfer data to and from an external personal computer or some other external device.

Referring to FIG. 15, the error rate evaluating device 300 comprises a CPU 304, a RAM 306, a ROM 308, an interface section 310 and an output section 312 connected to a CPU bus 302. The CPU 304 controls the components and the overall operation of the apparatus. The RAM 306 temporarily stores all intermediary data including the data obtained as a result of the processing operations of the CPU 304 carried out on the above image data and the data sent to the output section 312 as well as control data. For example, the intermediary data typically include error correcting code data including information data that may be audio information. The ROM 308 stores the program of the CPU 304 and also various parameters and table data. The interface section 310 is used to transfer data to and from an external dot code reader 200 as shown in FIG. 14. The output section 312 is used to display the result of a performance check obtained by processing the data transferred to the device by means of a monitor screen, a loud speaker and/or a printer.

Now, the operation of determining the error rate of a code image reader 200 of FIG. 14 in reading a dot code will be described by referring to the flow chart of FIG. 16.

Since Steps S70 through S82 in the flow chart are identical respectively with Steps S10 through S18, S40 and S24 in the flow chart of FIGS. 7A and 7B, they will not described any further here. Note, however, the flow chart of FIG. 16 differs from that of FIGS. 7A and 7B in that the operation is designed to observe the performance of various code image readers for reading a predetermined reference code image and determine variances in the performance of the code image readers. Therefore, the quality of the code images to be used for the examination should be above a certain level and, desirably, only a single code image will have to be used for examining the performance of different code image readers. Thus, the code image reading performance of different code image readers 200 can be reliably determined by using a single reference code image.

Figure 16:
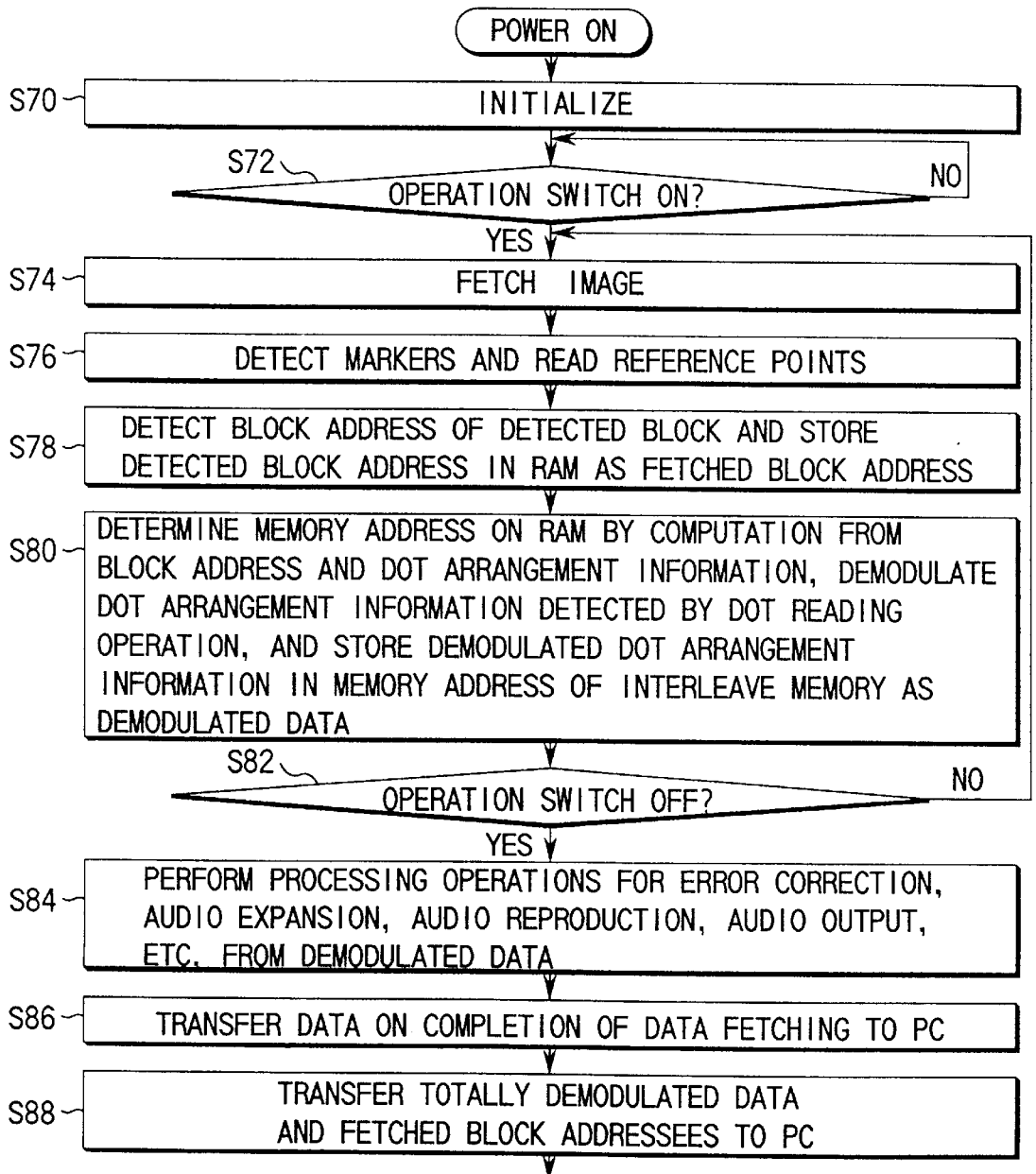
FIG. 16 is a flow chart of the operation of observing the error rate of the embodiment of code image reader of FIG. 14.

Returning to the flow chart of FIG. 16, if it is found in Step S82 that the operation switch is no longer in the depressed state, a series of processing operations including those of error correction, audio expansion and audio reproduction/output are performed (Step S84). However, any or all of the processing operations in Step S84 may be omitted because they are not directly related to the operation of checking the performance of the code image reader 200. Then, a signal representing the end of a data take-in operation is transmitted to the personal computer (PC) (not shown) connected by way of the interface section 218 of the code image reader 200 (Step S86) and, if the personal computer is ready for reception, all the demodulated data and the block address that has been taken in are transferred to the personal computer (Step S88) to end the processing operation of the flow chart.

While the code image reader 200 operates as host computer for the operation of transferring data to the personal computer in Steps S86 and S88 in the above description, the code image reader 200 does not necessarily have to act as host computer and a variety of alternative interface systems may be conceivable for the purpose of the invention. They may include the parallel SCSI system, the serial RS232C system, a system where the memory of the code image reader is recognized as part of the memory of the memory card loaded into the slot of the personal computer, the IRDA optical transfer system and the magnetic transfer system.

Now, the operation of the error rate evaluating device 300 comprising a personal computer and adapted to examine the performance of a code image reader and display the result of the examination as shown in FIG. 15 will be described. More specifically, the operation of processing all the demodulated data and displaying the result of the examination in Step S88 as illustrated in the flow chart of FIG. 16 will be described in detail by referring to the flow chart of FIG. 17.

Firstly, as the power switch in the switch section (not shown) is turned ON, the system will be initialized (Step S90). More specifically, a memory check is conducted on the RAM 306 to clear the latter and the display screen of the display section, or the output section 312, is cleared for initialization while the interface section 310 is initialized to communicate with external equipment. Then, the signal representing the end of a data take-in operation and transmitted in Step S86 in FIG. 16 is received by the interface section 310 (Step S92). This means that all the demodulated data are ready for examination. Upon receiving the signal representing the end of a data take-in operation, all the demodulated data transmitted in Step S88 of FIG. 16 and the taken in block addresses are received (Step S94).

Then, the demodulated data are subjected to an error detecting operation to determine the total number of detected errors and the total number of data from the information recorded in the demodulated data. Then, the data error rate is determined as the ratio of the total number of errors to the total number of data (Step S96). Since the steps from Step S98 on are identical with those from Step S42 on in FIGS. 7A and 7B, they will not be described here.

Figure 17:
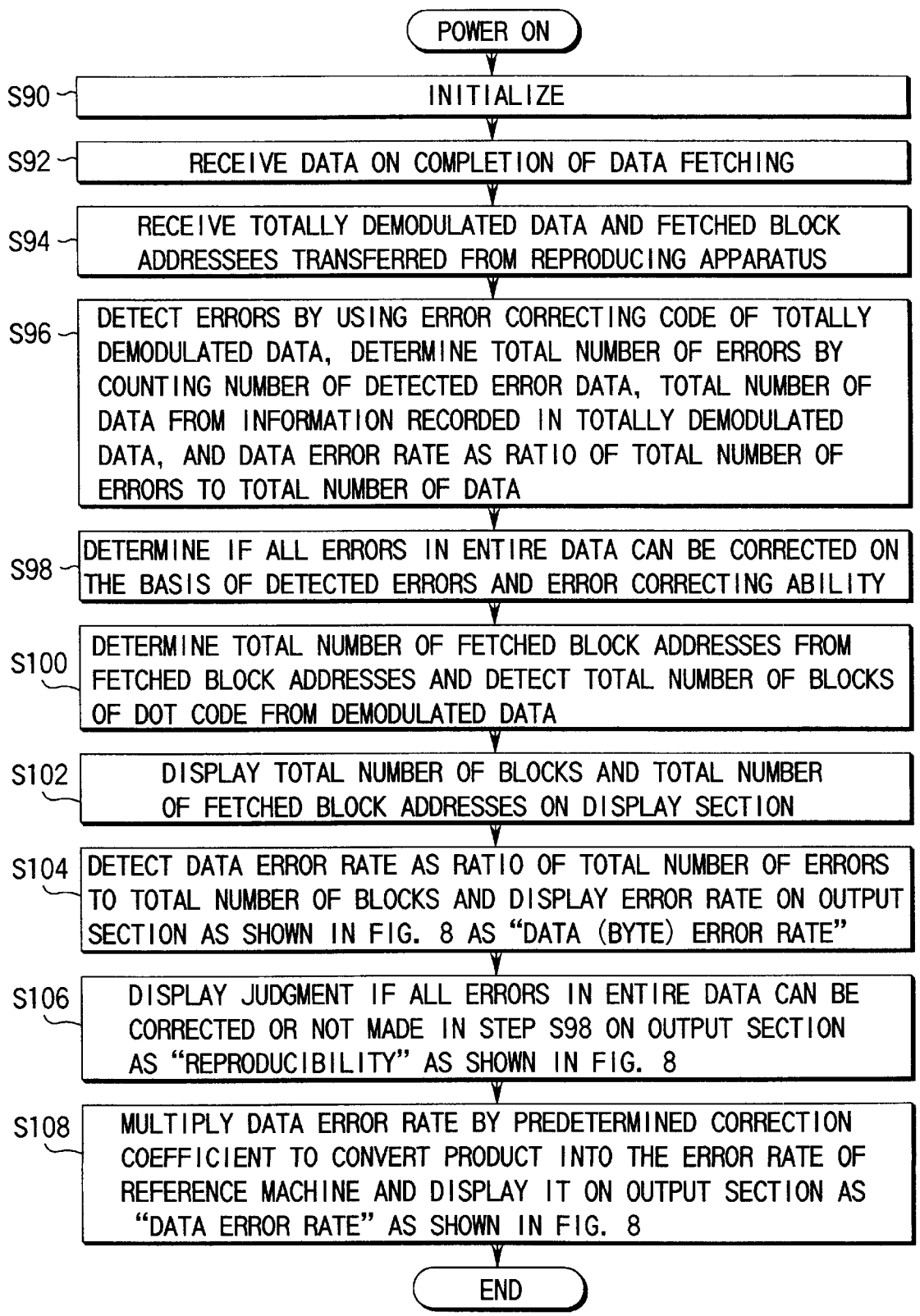
FIG. 17 is a flow chart of the operation of the error rate evaluating device.

While the performance of the code image reader is examined by seeing the data error rate of the reader in FIG. 17, the data error rate may not necessarily have to be used to determine the performance. For example, the dot error rate as described above by referring to the first embodiment or the fixed error rate as described above by referring to the third embodiment may alternatively be used for the purpose of the invention. Then, in stead of transferring all the demodulated data and the taken-in block addresses in Step S94 in FIG. 17, the detected dot arrangement information and the taken-in block addresses will be transferred in a manner as described above by referring to FIGS. 5 and 10.

The operations of Steps S74 through S84 in FIG. 16 of using the image data taken in Step S74 for the data to be transferred and processing the image data and those of Steps S92 through S108 in FIG. 17 may alternatively be conducted at the side of the error rate evaluating device 300 of FIG. 15.

Thus, the above described embodiment of error rate evaluating device is adapted to evaluate a code image reader in terms of its assemblage and variances in the performance of the illumination unit, the lens and the CCD in a simple manner and control its operation to ensure that a code image reader that operates stably for reading codes can be provided according to the invention.

While a code image reader is evaluated by determining various error rates to check the overall performance of the reader in the above description, the reader may alternatively be controlled for its overall performance by checking the function and the quality of each of the components. The flow charts of FIGS. 14 and 15 may be used to check the function and the quality of each of the components. This will be described briefly below.

Firstly, the image data taken in Step S74 is used as data to be transferred and the check device (error rate evaluating device 300) of FIG. 15 is used for the processing operations. The image pick-up section 204 of FIG. 14 comprises an illumination system including bulbs and a controller, an optical system including lenses, an image pick-up device and a drive circuit for driving the device. Thus, the distribution of light on the code image illuminated by the illumination system, the variances in the brightness of the screen attributable to the optical system and the image pick-up circuit and the overall volume of light can be examined to check the function of each of the components of the image pick-up section. The MTF (modulation transform function) and other functions of the lenses and other components can also be checked by using a test chart in place of the code image.

While the present invention is described above by way of embodiments, the present invention is not limited to the embodiments, which may be modified in various ways without departing from the scope of the invention. Thus, the present invention may be summarized as follows.

(1) A code image quality check apparatus adapted to check the quality of a code image printed and recorded on a printing medium as an optically readable image of error correcting code data containing information data including at least one of audio information, video information and digital data and adapted to be optically read by a manual scanning operation, the error correcting code data being provided with the ability to correct code image read errors attributable at least to one of the quality of the code image, the performance of the code image reader and the undefinable reading conditions resulting from the manual scanning operation, the code image quality check apparatus comprising:
read means for picking up and optically reading the code image;
restoration means for restoring the original error correcting code data from the code image read by the read means;
read error extraction means for extracting code image read errors from the data collected and unprocessed for error correction for the error correcting code data restored by the restoration means;
counter means for reducing the read errors extracted by the read error extraction means into numerical values and counting them, using a predetermined unit; and
notification means for indicating the numerical values obtained by the counter means in predetermined mode of notification.

Thus, according to the invention, there is provided a code image quality check apparatus adapted to check the quality of code images in a simple manner by sampling during the printing process without using a costly image pick-up section and an image analysis section. Such a code image quality check apparatus can reliably check the quality of the code image if there are not uncorrected errors left after the error correcting operation. There is also provided a code image reader adapted to examine the performance of such a code image quality check apparatus easily from the outside.

(2) The code image quality check apparatus according to (1), wherein the error extraction means includes means for comparing the error correcting code data restored by the restoration means and the error correcting code data corresponding to the code image to be printed and recorded and extracting any discrepancies as code image read errors.

This arrangement provides, in addition to the effects of (1) above, an effect that the code image quality check apparatus can examine the code image directly in a relatively simple manner to perform the examining operation accurately in a simple manner.

(3) The code image quality check apparatus according to (2), wherein the code image includes a dot pattern having a plurality of two-dimensionally arranged dot images having one of a predetermined reflectivity and a predetermined color corresponding to each "1" and "0" in the error correcting code data.

This arrangement provides, in addition to the effects of (1) above, an effect that the code image is made ready for comparison on the basis of the smallest unit for reading the dot code so that the state of the printed code image can be determined accurately.

(4) The code image quality check apparatus according to (1), wherein the read error extraction means includes means for extracting as code image errors the errors obtained by detecting errors from the restored error correcting code data by the restoration means.

This arrangement provides, in addition to the effects of (1) above, an effect that a plurality of code images to be checked that have different error correcting codes can be examined in a simple manner without operations of preparing and selecting ideal data to be used for comparison.

(5) The code image quality check apparatus according to (4), wherein the code image includes a dot pattern having a plurality of two-dimensionally arranged dot images having one of a predetermined reflectivity and a predetermined color corresponding to each "1" and "0" in the error correcting code data.

This arrangement provides, in addition to the effects of (4) above, an effect that the code image is made ready for comparison on the basis of the smallest unit for reading the dot code so that the state of the printed code image can be determined accurately.

(6) The code image quality check apparatus according to (1), further comprising standardization means for standardizing the numerical values for the code image read errors counted by the counter means among the code images to be examined.

This arrangement provides, in addition to the effects of (1) above, an effect that, in spite of the fact that read errors can vary as a function of code images with different volumes of information if expressed in sound of in some other form when they are printed with a same level of printing quality, the quality of printing can be determined quickly and accurately through standardization (normalization) among the code images to be examined.

(7) The code image quality check apparatus according to (1), further comprising numerical value correction means for correcting errors among the numerical values of the code image read errors counted by the counter means.

This arrangement provides, in addition to the effects of (1) above, an effect that code images can be examined accurately if the quality check apparatus operating as reference apparatus is replaced another quality check apparatus. Thus, variances in the reference values attributable to the quality check apparatus being used can be minimized to reduce the judgment errors.

(8) The code image quality check apparatus according to (1), wherein the code image is realized by arranged a plurality of blocks according to a predetermined block arrangement format, each of the blocks having at least a data pattern of images produced according to the block data obtained by dividing the error correcting code data by a predetermined volume of information and an address data pattern of images produced according to the address data representing the address assigned to each of the blocks; and the read error extraction means is adapted to compare the address of each of the blocks contained in the code image read by the read means and the address of each of the blocks contained in the code image to be printed and recorded, and to extract any discrepant addresses as code image read errors.

This arrangement provides, in addition to the effects of (1) above, an effect that a block address unrecognizable state that constitutes a serious trouble in the code image reading operation can be extracted as read error by ingeniously utilizing the physical format of the code image if compared with a known apparatus adapted to extract code image read errors on the basis of the error correcting code data so that the operation of examining the quality of printing can be carried out quickly in a simple manner.

(9) The code image quality check apparatus according to (1), wherein the read error extraction means further comprises error occurrence probability determining means for determining by computation the probability of an occurrence of code image read error when the read means reads a same spot on the code image for a predetermined number of times; and the spot is extracted as a code image read error when the probability value determined the error occurrence probability determining means exceeds a predetermined threshold value.

This arrangement provides, in addition to the effects of (1) above, an effect that any spot in the code image that gives rise to read errors for a number of times in repetitive scanning operations can be detected and the frequency of occurrence of read error can be determined. As a result, spots showing a high probability of occurrence of error can be detected and used to improve the code image code image quality. This means that relatively large stains, ink blots and scars that may be found on the spots with a high probability of occurrence of error can be detected easily not only on printed code images but also on the original plate of film to consequently reduce defective printed code images.

(10) A code image quality check apparatus adapted to check the quality of a code image printed and recorded on a printing medium as an optically readable image of error correcting code data containing information data including at least one of audio information, video information and digital data and adapted to be optically read by a manual scanning operation, the error correcting code data being provided with the ability to correct code image read errors attributable at least to one of the quality of the code image, the performance of the code image reader and the undefinable reading conditions resulting from the manual scanning operation, the code image quality check apparatus comprising:

read means for picking up and optically reading the code image;

restoration means for restoring the original error correcting code data from the code image read by the read means;

read error extraction means for extracting code image read errors from the data collected and unprocessed for error correction for the error correcting code data restored by the restoration means;

read error location detection means for detecting the respective locations of the code image read errors extracted by the read error extraction on the code image; and display means for displaying the locations of the errors detected by the read error location detection means.

Thus, according to the invention, there is provided a code image quality check apparatus adapted to detect the locations of the read errors, which are defective spots. Therefore, the defective spots on the original plate that may or may not be made of film and those on the printed code image can be compared to identify the causes of the defects, which may be fed back to the printing process to minimize the production of defective printed matters.

(11) The code image quality check apparatus according to (10), wherein the error extraction means includes means for comparing the error correcting code data restored by the restoration means and the error correcting code data corresponding to the code image to be printed and recorded and extracting any discrepancies as code image read errors.

This arrangement provides, in addition to the effects of (10) above, an effect that the code image quality check apparatus can examine the code image directly in a relatively simple manner to perform the examining operation accurately in a simple manner.

(12) The code image quality check apparatus according to (11), wherein the code image includes a dot pattern having a plurality of two-dimensionally arranged dot images having one of a predetermined reflectivity and a predetermined color corresponding to each "1" and "0" in the error correcting code data.

This arrangement provides, in addition to the effects of (11) above, an effect that the code image is made ready for comparison on the basis of the smallest unit for reading the dot code so that the state of the printed code image can be determined accurately.

(13) The code image quality check apparatus according to (10), wherein the read error extraction means includes means for extracting as code image errors the errors obtained by detecting errors from the restored error correcting code data by the restoration means.

This arrangement provides, in addition to the effects of (10) above, an effect that a plurality of code images to be checked that have different error correcting codes can be examined in a simple manner without operations of preparing and selecting ideal data to be used for comparison.

(14) The code image quality check apparatus according to (13), wherein the code image includes a dot pattern having a plurality of two-dimensionally arranged dot images having one of a predetermined reflectivity and a predetermined color corresponding to each "1" and "0" in the error correcting code data.

This arrangement provides, in addition to the effects of (13) above, an effect that the code image is made ready for comparison on the basis of the smallest unit for reading the dot code so that the state of the printed code image can be determined accurately.

(15) The code image quality check apparatus according to (10), wherein the code image is realized by arranged a plurality of blocks according to a predetermined block arrangement format, each of the blocks having at least a data pattern of images produced according to the block data obtained by dividing the error correcting code data by a predetermined volume of information and an address data pattern of images produced according to the address data representing the address assigned to each of the blocks; and the read error extraction means is adapted to compare the address of each of the blocks contained in the code image read by the read means and the address of each of the blocks contained in the code image to be printed and recorded, and to extract any discrepant addresses as code image read errors.

This arrangement provides, in addition to the effects of (10) above, an effect that a block address unrecognizable state that constitutes a serious trouble in the code image reading operation can be extracted as read error by ingeniously utilizing the physical format of the code image if compared with a known apparatus adapted to extract code image read errors on the basis of the error correcting code data so that the operation of examining the quality of printing can be carried out quickly in a simple manner.

(16) A code image reader comprising:

read means for picking up and optically reading a code image printed and recorded on a printing medium as an optically readable image of error correcting code data containing information data including at least one of audio information, video information and digital data and adapted to be optically read by a manual scanning operation;

restoration means for restoring the original error correcting code data from the code image read by the read means;

error correction processing means for processing the error correcting code data restored by the restoration means for error correction; and output means for externally outputting the data processed for error correction by the error correction means, wherein the error correcting code data is provided with the ability to correct code image read errors attributable at least to one of the quality of the code image, the performance of the code image reader and the undefinable reading conditions resulting from the manual scanning operation; and the code image reader further comprises interface means for outputting one of the error correcting code data read by the read means and restored by the restoration means and the code image data read by the read means to an external check device for checking the performance of the code image reader from the viewpoint of code image read errors.

With this arrangement, the performance of a code image reader can be examined and a plurality of code image readers can be checked for variances in the performance so that code image readers that operate reliably can be provided to users.

(17) The code image reader according to (16), wherein the one of the error correcting code data restored by the restoration means and the code image data read by the read means output by the interface means for checking the performance of the code image reader from the viewpoint of code image read errors is data based on a predetermined reference code image provided for examination.

This arrangement provides, in addition to the effects of (16) above, an effect of providing code image readers that operate reliably for reading code images can be supplied to users because the performance of a code image reader is conducted by referring to a predetermined reference code image provided for examination.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claim is:

1. A code image quality check apparatus adapted to check a quality of a code image printed and recorded on a printing medium as an optically readable image of error correcting code data containing information data including at least one of audio information, video information and digital data and adapted to be optically read by a manual scanning operation, said error correcting code data being provided with an ability to correct code image read errors attributable at least to one of the quality of the code image, a performance of the code image reader and undefinable reading conditions resulting from the manual scanning operation, and said code image quality check apparatus comprising:

read means for picking up and optically reading said code image;

restoration means for restoring the error correcting code data from the code image read by said read means;

read error extraction means for extracting the code image read errors from the error correcting code data restored by said restoration means, without processing the restored error correcting code data to actually correct the code image read errors;

counter means for reducing the code image read errors extracted by said read error extraction means into numerical values, and for counting the code image read errors; and notification means for indicating the numerical values obtained by the counter means in a predetermined mode of notification.

2. The code image quality check apparatus according to claim 1, wherein said error extraction means includes means for comparing the error correcting code data restored by said restoration means and the error correcting code data corresponding to the code image to be printed and recorded and extracting any discrepancies as code image read errors.

3. The code image quality check apparatus according to claim 2, wherein said code image includes a dot pattern having a plurality of two-dimensionally arranged dot images having one of a predetermined reflectivity and a predetermined color corresponding to each "1" and "0" in the error correcting code data.

4. The code image quality check apparatus according to claim 1, wherein said read error extraction means includes means for extracting as code image errors the errors obtained by detecting errors from the restored error correcting code data by said restoration means.

5. The code image quality check apparatus according to claim 4, wherein said code image includes a dot pattern having a plurality of two-dimensionally arranged dot images having one of a predetermined reflectivity and a predetermined color corresponding to each "1" and "0" in the error correcting code data.

6. The code image quality check apparatus according to claim 1, further comprising standardization means for standardizing the numerical values for said code image read errors counted by said counter means among the code images to be examined.

7. The code image quality check apparatus according to claim 1, further comprising numerical value correction means for correcting errors among the numerical values of the code image read errors counted by said counter means.

8. The code image quality check apparatus according to claim 1, wherein:

said code image is realized by arranged a plurality of blocks according to a predetermined block arrangement format, each of said blocks having at least a data pattern of images produced according to the block data obtained by dividing said error correcting code data by a predetermined volume of information and an address data pattern of images produced according to the address data representing the address assigned to each of the blocks; and said read error extraction means is adapted to compare the address of each of said blocks contained in the code image read by said read means and the address of each of the blocks contained in the code image to be printed and recorded, and to extract any discrepant addresses as code image read errors.

9. The code image quality check apparatus according to claim 1, wherein:

said read error extraction means further comprises error occurrence probability determining means for determining by computation a probability of an occurrence of code image read error when said read means reads a same spot on the code image a predetermined number of times; and said spot is extracted as one of the code image read errors when the probability determined said error occurrence probability determining means exceeds a predetermined threshold value.

10. A code image quality check apparatus adapted to check a quality of a code image printed and recorded on a printing medium as an optically readable image of error correcting code data containing information data including at least one of audio information, video information and digital data and adapted to be optically read by a manual scanning operation, said error correcting code data being provided with an ability to correct code image read errors attributable at least to one of the quality of the code image, a performance of the code image reader and undefinable reading conditions resulting from the manual scanning operation, and said code image quality check apparatus comprising:

read means for picking up and optically reading said code image;

restoration means for restoring original error correcting code data from the code image read by said read means;

read error extraction means for extracting the code image read errors from the error correcting code data restored by said restoration means, without processing the restored error correcting code data to actually correct the code image read errors;

read error location detection means for detecting respective locations of the code image read errors extracted by said read error extraction means on the code image; and display means for displaying the locations of the errors detected by said read error location detection means.

11. The code image quality check apparatus according to claim 10, wherein said error extraction means includes means for comparing the error correcting code data restored by said restoration means and the error correcting code data corresponding to the code image to be printed and recorded and extracting any discrepancies as code image read errors.

12. The code image quality check apparatus according to claim 11, wherein said code image includes a dot pattern having a plurality of two-dimensionally arranged dot images having one of a predetermined reflectivity and a predetermined color corresponding to each "1" and "0" in the error correcting code data.

13. The code image quality check apparatus according to claim 10, wherein said read error extraction means includes means for extracting as code image errors the errors obtained by detecting errors from the restored error correcting code data by said restoration means.

14. The code image quality check apparatus according to claim 13, wherein said code image includes a dot pattern having a plurality of two-dimensionally arranged dot images having one of a predetermined reflectivity and a predetermined color corresponding to each "1" and "0" in the error correcting code data.

15. The code image quality check apparatus according to claim 10, wherein:

said code image is realized by arranged a plurality of blocks according to a predetermined block arrangement format, each of said blocks having at least a data pattern of images produced according to the block data obtained by dividing said error correcting code data by a predetermined volume of information and an address data pattern of images produced according to the address data representing the address assigned to each of the blocks; and said read error extraction means is adapted to compare the address of each of said blocks contained in the code image read by said read means and the address of each of the blocks contained in the code image to be printed and recorded, and to extract any discrepant addresses as code image read errors.

* * * * *

UNITED STATES PATENT AND TRADEMARK OFFICE
CERTIFICATE OF CORRECTION

PATENT NO. : 6,050,731
DATED : April 18, 2000
INVENTOR(S) : Shinzo MATSUI

It is certified that error appears in the above-indentified patent and that said Letters Patent is hereby corrected as shown below:

Item [45] Date of Patent, insert --*-- before

"Apr. 25, 2000".

Under item [73] Assignee, insert

--[*] Notice: This patent issued on a continued prosecution application filed under 37 CFR 1.53(d), and is subject to the twenty year patent term provisions of 35 U.S.C. 1.54(a)(2).--.

Signed and Sealed this

Tenth Day of April, 2001

Attest:

NICHOLAS P. GODICI

*Attesting Officer*     Acting Director of the United States Patent and Trademark Office